United States Patent
Tsuruoka et al.

(10) Patent No.: US 7,150,256 B2
(45) Date of Patent: Dec. 19, 2006

(54) INTAKE DEVICE OF MULTI-CYLINDER ENGINE

(75) Inventors: Yoshikazu Tsuruoka, Tokyo (JP); Shigeki Mukai, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/244,096

(22) Filed: Oct. 6, 2005

(65) Prior Publication Data

US 2006/0070595 A1    Apr. 6, 2006

(30) Foreign Application Priority Data

Oct. 6, 2004    (JP) ............................ 2004-293412

(51) Int. Cl.
*F02M 35/10*    (2006.01)
(52) U.S. Cl. ................................ 123/184.35; 123/54.4
(58) Field of Classification Search ............... 123/54.4, 123/54.5, 54.6, 54.7, 54.8, 184.35, 184.36
See application file for complete search history.

(56) References Cited

FOREIGN PATENT DOCUMENTS

| JP | 61-049160 A | | 3/1986 |
|----|-------------|---|--------|
| JP | 08061069 A | * | 3/1996 |

* cited by examiner

*Primary Examiner*—Noah P. Kamen
(74) *Attorney, Agent, or Firm*—Foley & Lardner LLP

(57) ABSTRACT

Air is aspirated by cylinders of cylinder rows (11, 12) via branch pipes (23,24) from two intake collectors (21,22) of a V type multi-cylinder internal combustion engine. An auxiliary chamber (31, 32) is formed using the space between adjacent branch pipes (23,24). A communication port (25, 26) to the intake collector (21,22) of the auxiliary chamber (31,32) is formed between the openings (23A,24A) to the intake collector (21,22) of two adjacent branch pipes (23, 24). Since the effective volume of the intake collector (21,22) increases due to the auxiliary chamber (31,32), residual resonance in the intake collector (21, 22) decreases. The auxiliary chamber (31,32) increases an intake inertia effect by increasing the flow rate of the branch pipes (23,24) in the second half of the intake stroke relative to the flow rate in the first half of the intake stroke. Engine volume efficiency is thereby improved using a limited space.

6 Claims, 10 Drawing Sheets

INTAKE DEVICE OF MULTI-CYLINDER ENGINE

FIELD OF THE INVENTION

This invention relates to the intake device of an internal combustion engine which has two cylinder rows as in a V type engine.

BACKGROUND OF THE INVENTION

Tokkai Sho 61-49160 published by the Japan Patent Office in 1983 discloses an intake manifold disposed in the space between the cylinder row of a V type internal combustion engine. An intake collector is disposed in the center of the two cylinder rows. The intake collector temporarily stores air aspirated from the throttle chamber, and distributes the air to each cylinder of the cylinder rows via a branch pipe.

SUMMARY OF THE INVENTION

To optimize the intake performance of each cylinder, it is preferred to provide an intake collector and a throttle chamber for each cylinder row.

Even in this case, when the V type internal combustion engine is an engine to be mounted in a vehicle, it is difficult to guarantee that the intake collector will have sufficient volume due to spatial restrictions on the engine room.

If the volume of the intake collector is not sufficient, the resonance wave remaining in the intake collector will impair the intake performance enhancement arising from inertia. Also, the pressure difference between the cylinder and the intake collector becomes small as a result of air intake in the first half of the intake stroke. Reduction of this pressure difference impairs the intake performance enhancement arising from inertia in the second half of the intake stroke. As a result, reduction of the intake amount of each cylinder cannot be avoided. This reduction in intake amount means a loss of engine power.

If the volume of the intake collector is small, depending on the connection position of the throttle chamber, an imbalance will occur in the air distribution the branch pipe from the intake collector to each cylinder, and a fluctuation will easily arise in the volumetric efficiency of each cylinder.

It is therefore an object of this invention to eliminate a fluctuation in the volumetric efficiency of the cylinders in an internal combustion engine wherein the installation space of the intake collector is limited, as in a V type internal combustion engine.

In order to achieve the above object, this invention provides an intake device for a multi-cylinder internal combustion engine having a crank shaft and two rows of cylinders aligned substantially in parallel with the crank shaft. The device comprises two intake collectors respectively provided in the vicinity of the two rows of cylinders, an air supply mechanism connected to the intake collectors to supply air thereto, and a group of branch pipes provided in each of the two rows of cylinders, wherein the branch pipes are disposed substantially in parallel with each other and connect the cylinders in the corresponding row with the corresponding intake collector. Each of the branch pipes has an opening onto the corresponding intake collector.

The device further comprises an auxiliary chamber provided for each of the two rows of cylinders in a space between the two intake collectors. Herein, the space includes a space between adjacent two branch pipes of the corresponding row. The device further comprises a communicating port formed between the openings of the adjacent two branch pipes in each of the rows of cylinders and communicating the corresponding auxiliary chamber with the corresponding intake collector.

The details as well as other features and advantages of this invention are set forth in the remainder of the specification and are shown in the accompanying drawings.

DESCRIPTION OF THE PREFERRED EMBODIMENTS

Figure 1:
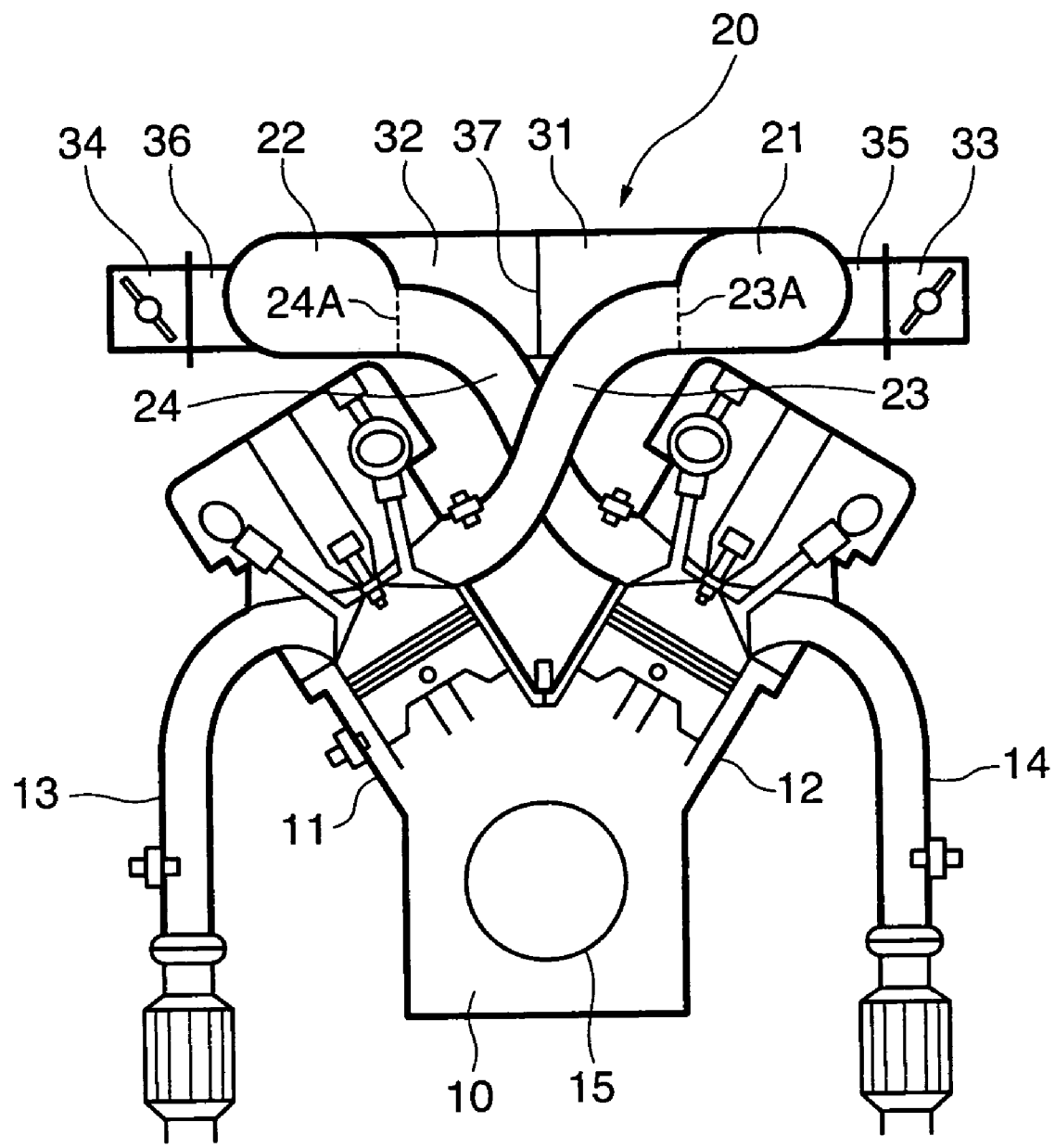
FIG. 1 is a schematic longitudinal sectional view of a V type six-cylinder internal combustion engine provided with an intake device according to this invention.

Referring to FIG. 1 of the drawings, a V type six-cylinder internal combustion engine for vehicles which applies the intake device according to this invention is provided with a first cylinder row 11 and second cylinder row 12 which are disposed in a V shape above a common crankcase 10. The first cylinder row 11 and second cylinder row 12 are both provided with three cylinders aligned parallel with a crankshaft 15. An engine is further provided with an intake device 20 and exhaust passages 13, 14.

The exhaust gas of the three cylinders of the first cylinder row 11 is discharged into the atmosphere via the exhaust passage 13.

The exhaust gas of the three cylinders of the second cylinder row 12 is discharged into the atmosphere via the exhaust passage 14.

The exhaust device 20 comprises an intake collector 21, three branch pipes 23 connected from the intake collector 21 to the three cylinders of the first cylinder row 11 respectively, an intake collector 22, and three branch pipes 24 connected from the intake collector 22 to the three cylinders of the second cylinder row respectively.

The branch pipes 23 and branch pipes 24 are arranged so that they cross each other, as shown in the figure. However, the branch pipes 23 can be connected to each cylinder of the second cylinder row 12, and the branch pipes 24 connected to each cylinder of the first cylinder row 11, without making the branch pipes 23 and branch pipes 24 cross each other.

The intake device 20 comprises auxiliary chambers 31, 32 situated between the intake collector 21 and intake collector 22.

The auxiliary chambers 31, 32 are situated adjacent to each other via a partition 37. A throttle chamber 33 which houses an intake throttle is connected to the intake collector 21 via a connection port 35. A throttle chamber 34 housing an intake throttle is connected to the intake collector 22 via a connection port 36. The throttle chambers 33, 34 form an air supply mechanism according to the claims.

Figure 2:
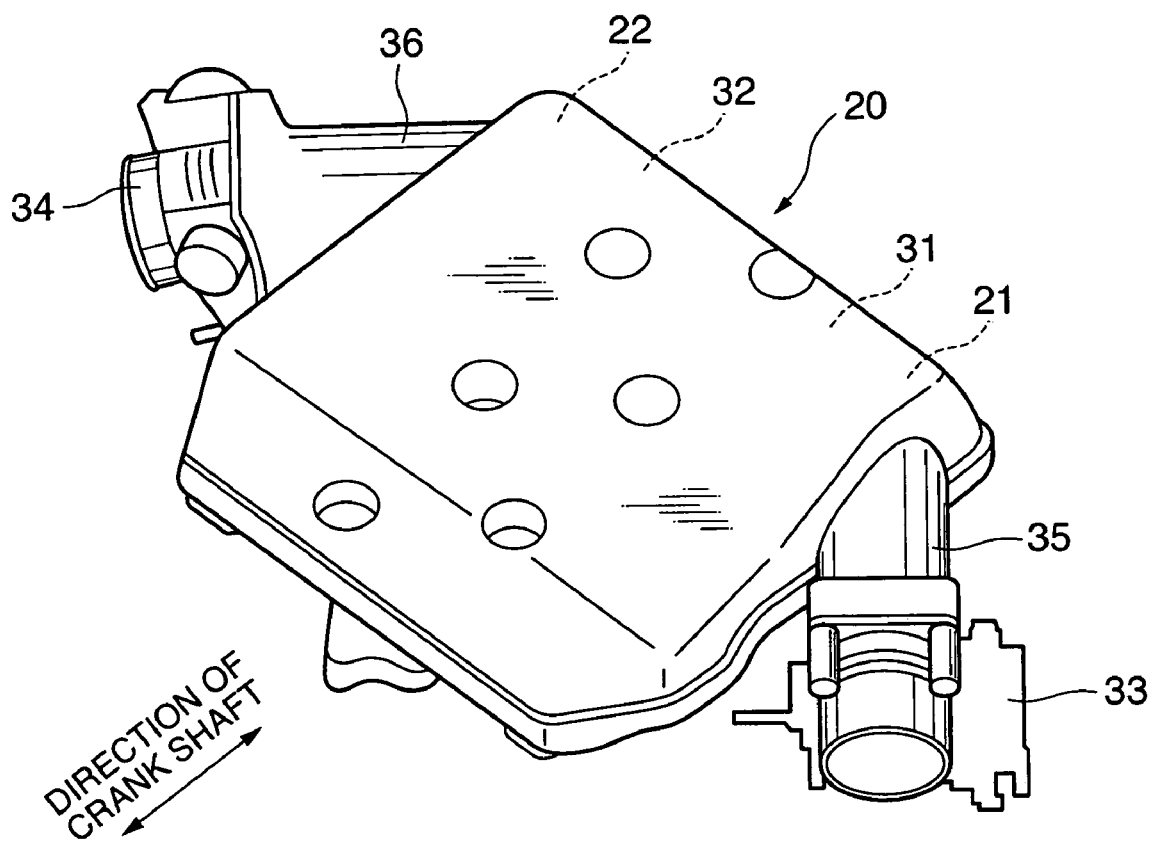
FIG. 2 is a perspective view of the intake device.

Referring to FIG. 2, the connection port 35 projects in a slanting direction relative to the direction of the crankshaft 15 from the intake collector 21. The connection port 36 projects in a slanting direction relative to the direction of the crankshaft 15 from the intake collector 22. Air is supplied to the throttle chambers 33, 34 from intake passages, respectively.

Figure 3:
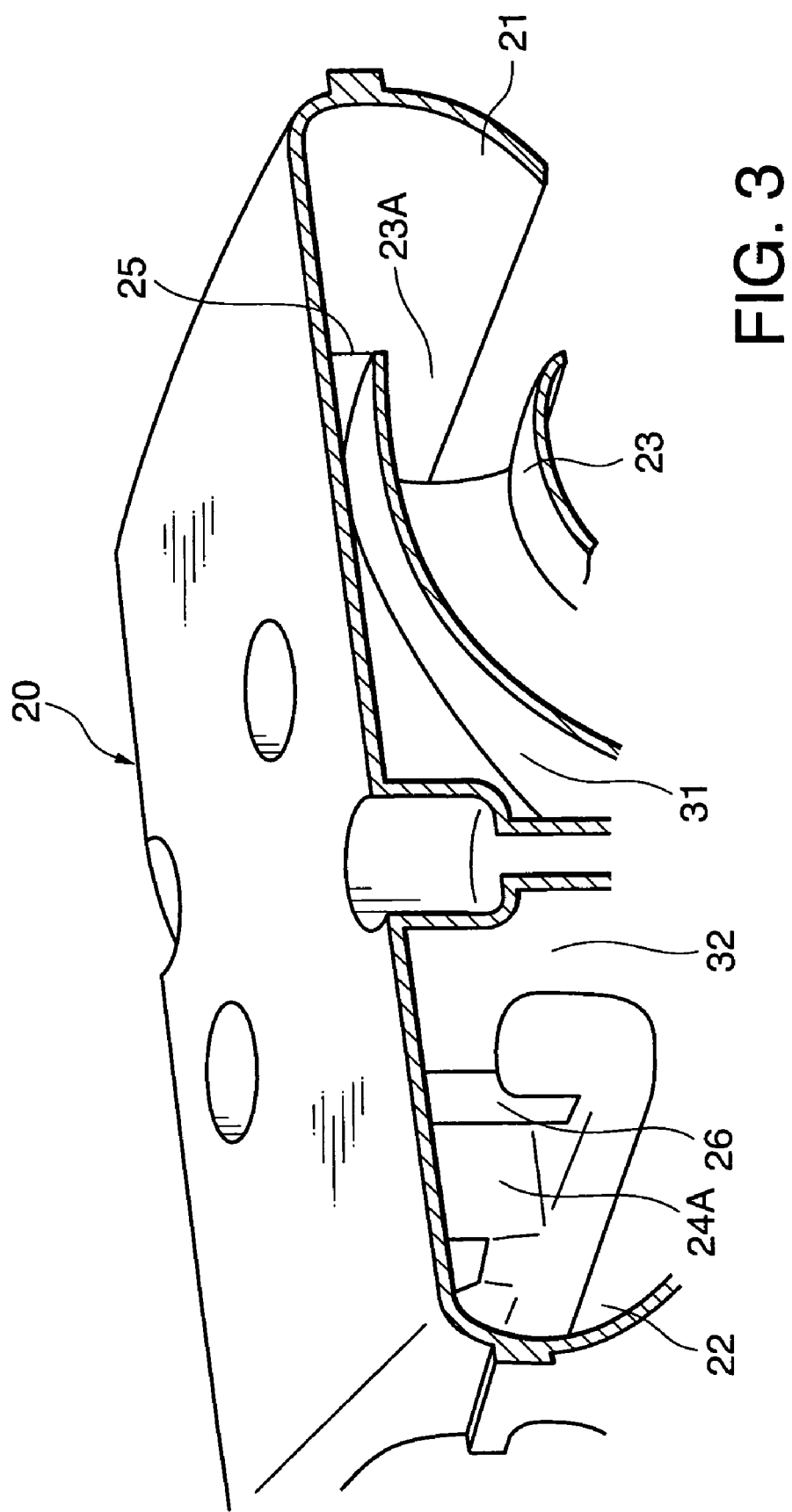
FIG. 3 is a perspective view of the intake device with part cut away for the purpose of easier description.
Figure 4:
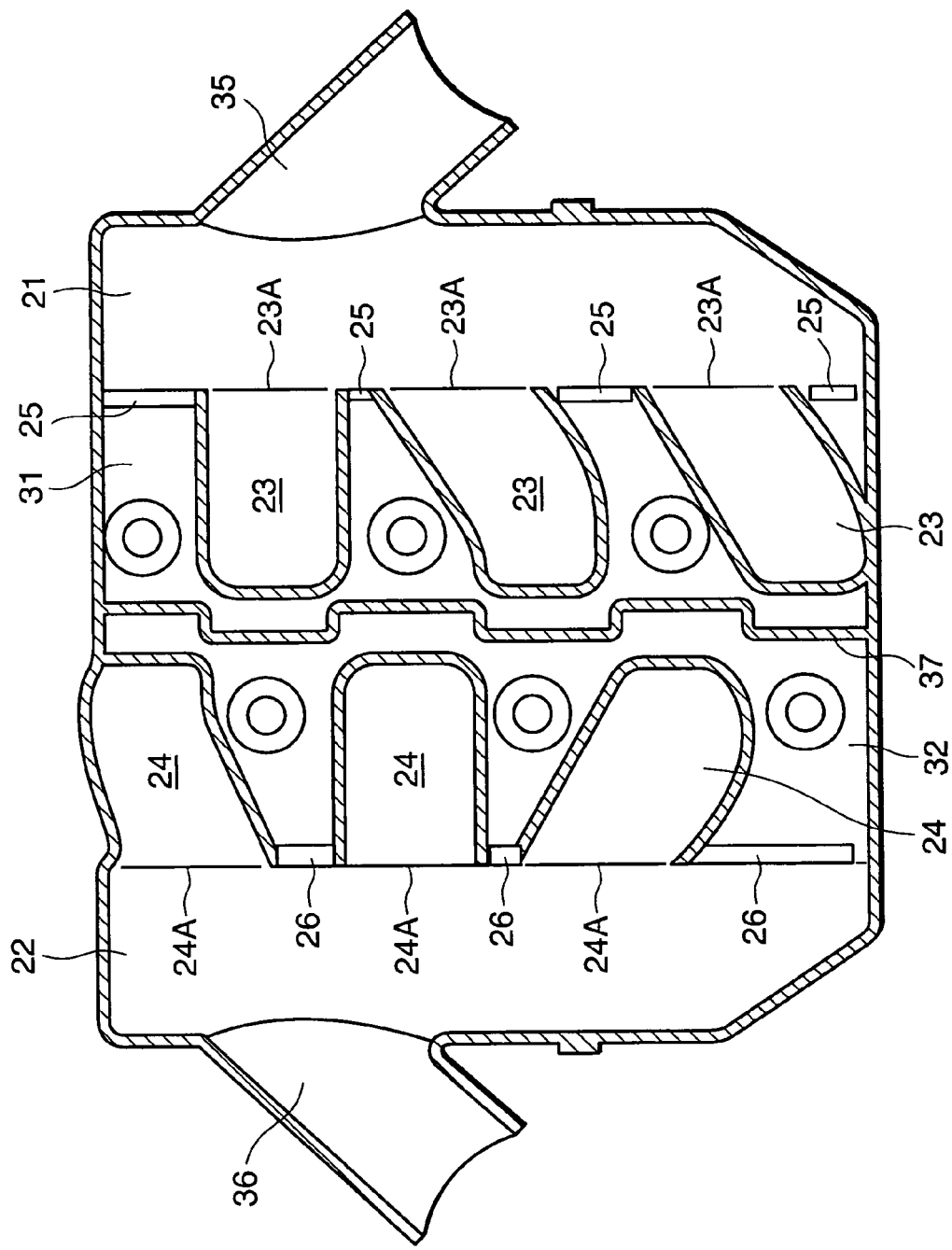
FIG. 4 is a horizontal sectional view of the intake device.

Referring to FIG. 4, the interior of the intake device 20 is divided into a first intake unit for the first cylinder row 11 and a second intake unit for the second cylinder row 12 by the partition 37. In the first intake unit, all the space other than the space occupied by the intake collector 21 and the three branch pipes 23, including a space above the branch pipes 23 shown in FIG. 3, is effectively used as the auxiliary chamber 31. The auxiliary chamber 31 communicates with the intake collector 21 via communication ports 25 shown in FIG. 4. Although the communication ports 25 are drawn at four places in FIG. 4, as shown in FIG. 2, the communication ports 25 permit communication between the auxiliary chamber 31 and intake collector 21 even above the branch pipes 23. The communication ports 25 are therefore formed over the whole length parallel to the crankshaft 15 inside the intake device 20. Likewise, all the space other than the space occupied by the intake collector 22 and the branch pipes 24 in the second intake unit is effectively used as the auxiliary chamber 32. Communication ports 26 formed over the whole length parallel to the crankshaft 15 inside the intake device 20 permit communication between the auxiliary chamber 32 and intake collector 21.

Next, referring to FIGS. 5–7, FIGS. 8A, 8B, FIGS. 9A, 9B, FIGS. 10A, 10B and FIGS. 11, 12, the operation and effect of this intake device 20 will be described. These diagrams are all based on experimental data obtained by the Inventors.

Figure 5:
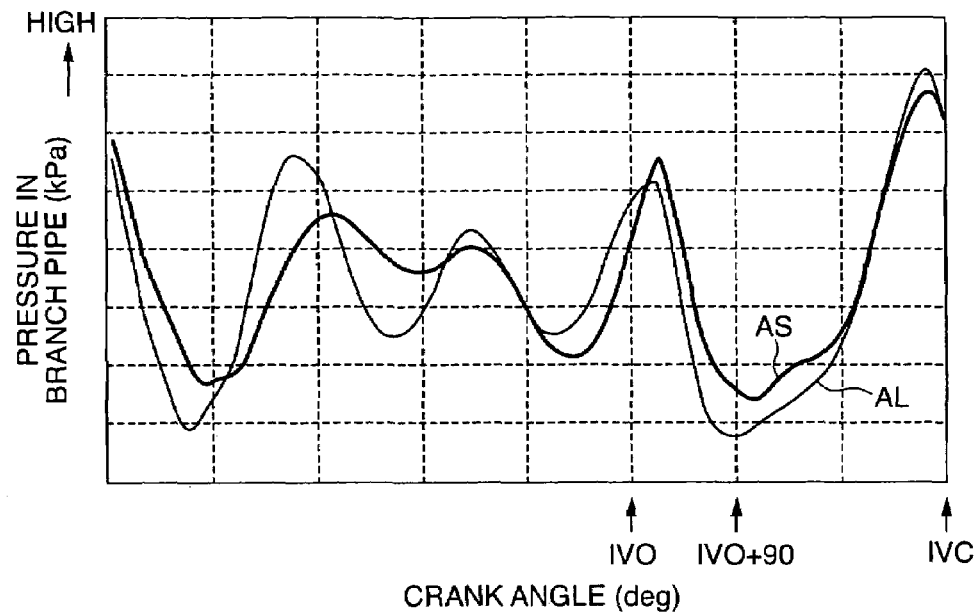
FIG. 5 is a diagram showing a pressure fluctuation of a branch pipe in the vicinity of an intake stroke.
Figure 6:
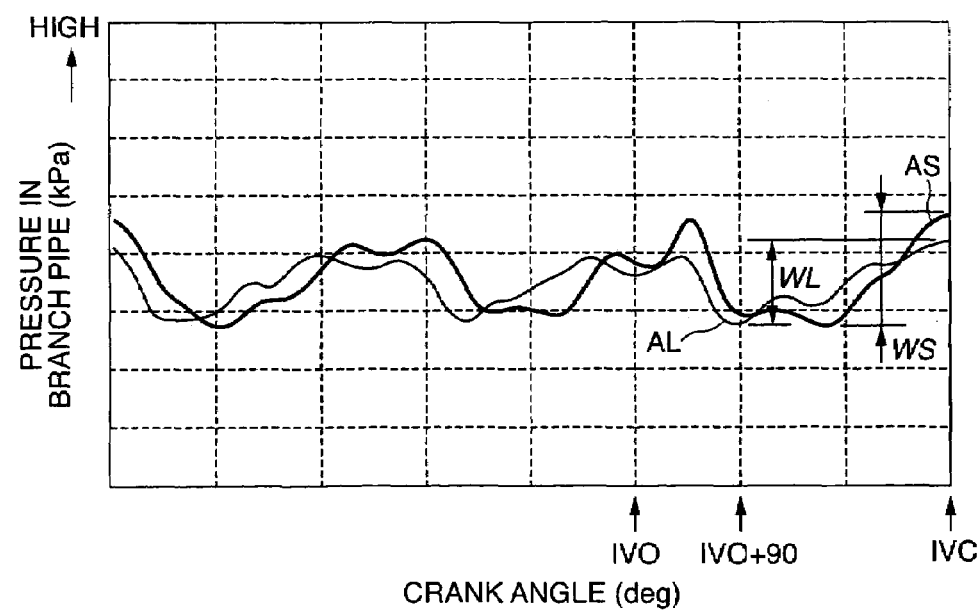
FIG. 6 is a diagram showing a pressure fluctuation of an intake collector in the vicinity of the intake stroke.

FIG. 5 shows a variation in the intake pressure of the branch pipes 23(24) with respect to the crank angle when the engine is running at maximum output. FIG. 6 shows the variation in the intake pressure of the intake collector 21(22) with respect to the crank angle under the same conditions. The unit of crank angle is degrees (deg). The unit of pressure is kilopascal (kPa). The symbol IVO in the figures shows the timing of intake valve opening, and the symbol IVC shows the timing of intake valve closing.

The curve AS represents the pressure change when the surface area of the communication port 25(26) is small, and the curve AL represents the pressure change when the surface area of the communication port 25(26) is large.

Referring to FIG. 5, the period from IVO to IVC, i.e., the period during which the intake valve is open, is effectively equivalent to the intake stroke. A large peak is formed in the pressure in the branch pipe 23(24) immediately after the intake valve opens, and immediately before it closes. Because of these peaks, the fluctuation of intake pressure in the branch pipes 23(24) in the intake stroke is larger than during other strokes.

To increase the intake amount of each cylinder and to achieve a high volumetric efficiency, the intake performance enhancement due to inertia, i.e., the inertia effect, must be used. Here, the volumetric efficiency is a value obtained by dividing the intake air amount of the cylinder by the piston stroke capacity, and the engine output is also increased by enhancing the volumetric efficiency.

Regarding the intake pressure of the branch pipes 23(24), the inertia effect is obtained by increasing the pressure fluctuation due to the peak immediately before the intake valve closes relative to the pressure fluctuation due to the peak immediately after the intake valve opens.

In FIG. 5, if the curve AL with a large surface area of the communication port 25(26) is compared with the curve AS with a small surface area of the communication port 25(26), the former is superior to the latter in satisfying this condition. If the communication port 25(26) is not provided, the amplitude of the pressure pulse wave is approximately equal before and after the intake stroke, the width of the pressure fluctuation immediately before the intake stroke increases, and due to this, the pressure fluctuation width after completion of the intake stroke decreases, so a desirable inertia effect is not obtained.

Referring to FIG. 6, regarding the fluctuation width of the intake pressure in the intake collector 21(22), the curve AS with a small surface area of the communication port 25(26) exceeds the curve AL with a large surface area of the communication port 25(26). The symbol WS in the figure shows the maximum fluctuation width of the intake pressure in the curve AS. The symbol WL shows the maximum fluctuation width of the intake pressure in the curve AL. To attenuate the intake pulse and also to attenuate the resonance effect remaining from the immediately preceding intake stroke, it is preferred to decrease the fluctuation width of the intake pressure in the intake collector 21(22).

From the curve AL in FIGS. 5 and 6, it can be read that the volume of the intake collector 21(22) is effectively expanded by the auxiliary chamber 31(32), and as a result, the intake pulse is attenuated, the resonance effect remaining from the immediately preceding intake stroke is attenuated and the inertia effect is increased.

Figure 7:
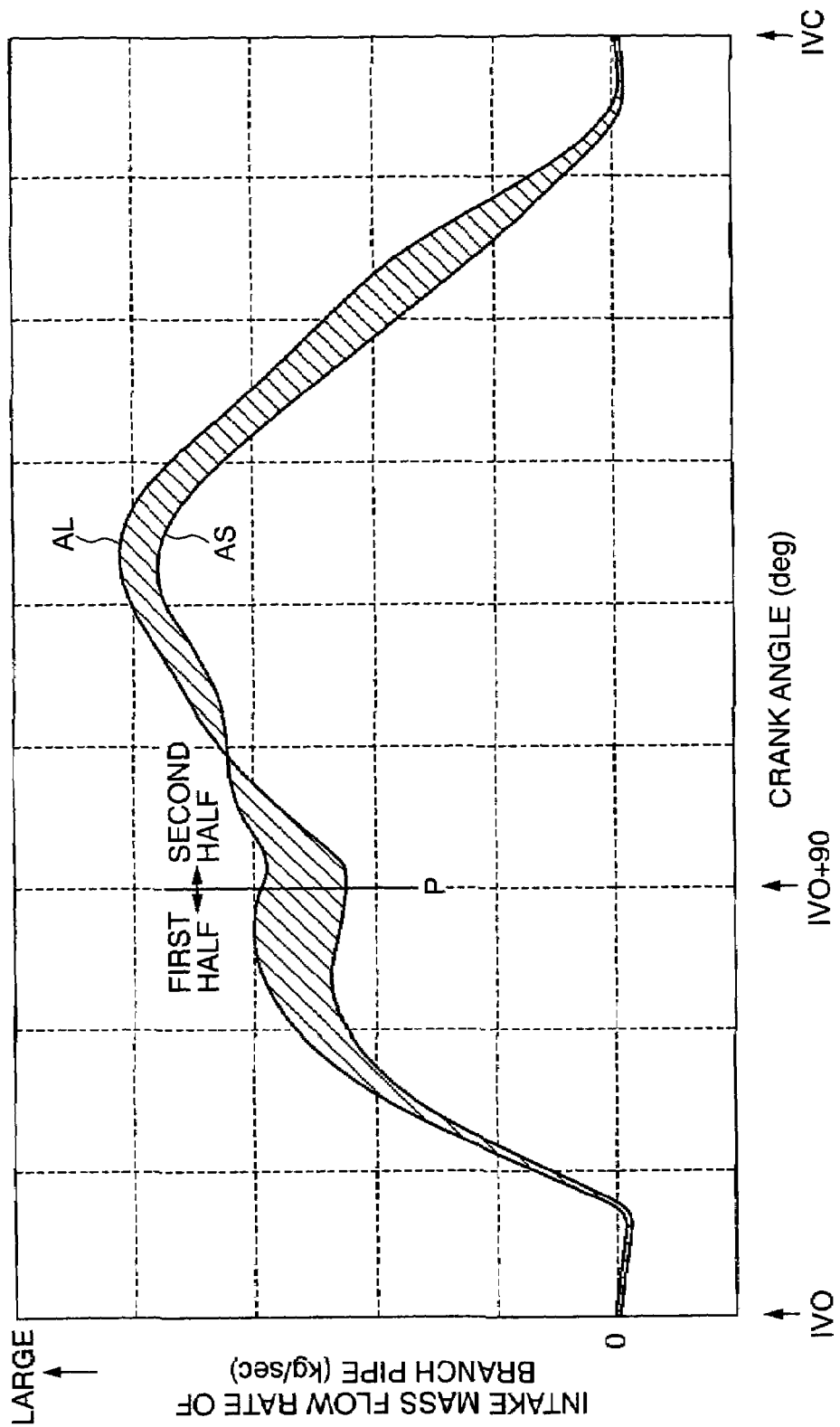
FIG. 7 is a diagram showing a variation of an intake air mass flow rate of the branch pipe during the intake stroke.

Referring to FIG. 7, the intake stroke is divided into a first half and a second half by a vertical line P. In FIG. 5, the vertical line P is set to 90 degrees after IVO at which the pressure of the branch pipes 23(24) is a minimum.

For the curve AL wherein the surface area of the communication port 25(26) is large, more than for the curve AS wherein the surface area of the communication port 25(26) is small, the intake air amount in the first half of the intake stroke is small and the intake air amount in the second half is large. Even if the intake amount in the first half of the intake stroke is large, the intake inertia effect does not contribute much to the air intake in the second half of the intake stroke. On the other hand, the intake inertia effect will contribute substantially to increase the intake amount in the second half of the intake stroke if the intake amount in the first half of the intake stroke is small. As a result, the curve AL with little intake amount in the first half shows an overall high volumetric efficiency.

Now, the air flow in the intake device 20 will be described.

If the communication ports 25(26) are provided, in the first half of the intake stroke, air is directly aspirated mainly from the intake collector 21(22) to the branch pipes 23(24). In the second half of the intake stroke, inflowing air from the auxiliary chamber 31(32) to the branch pipes 23(24) also assists the intake capability of the branch pipes 23(24). This is also true for every cylinder.

FIGS. 8A, 8B, FIGS. 9A, 9B and FIGS. 10A, 10B relate to the mass flow rate of the branch pipes 23(24). The units kg/sec-deg of on the vertical axis of each diagram show the intake mass flow rate per degree of crank angle of the branch pipes 23(24).

Figure 8A:
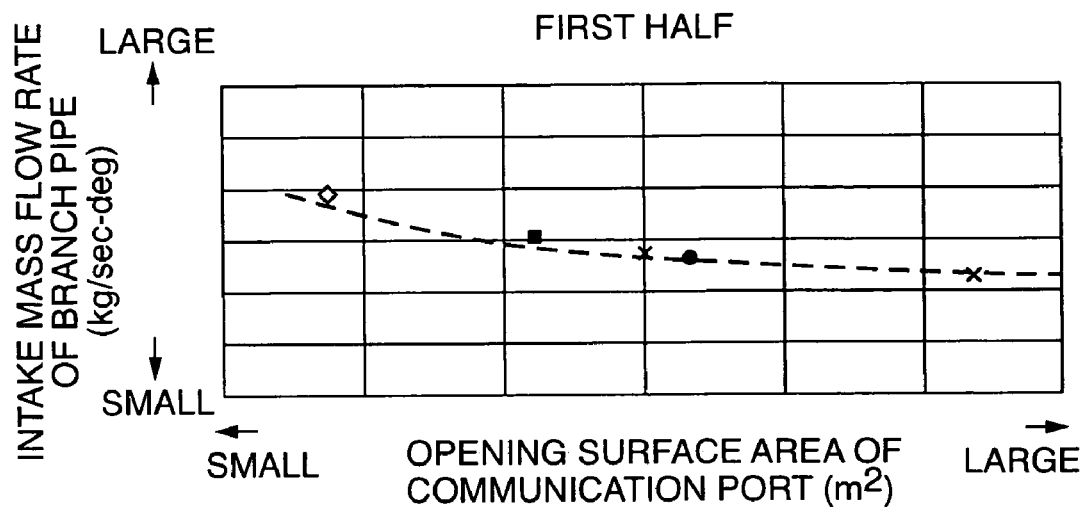
FIGS. 8A and 8B are diagrams describing a relation between the opening surface area of a communication port and the intake air mass flow rate of the branch pipe according to this invention.
Figure 8B:
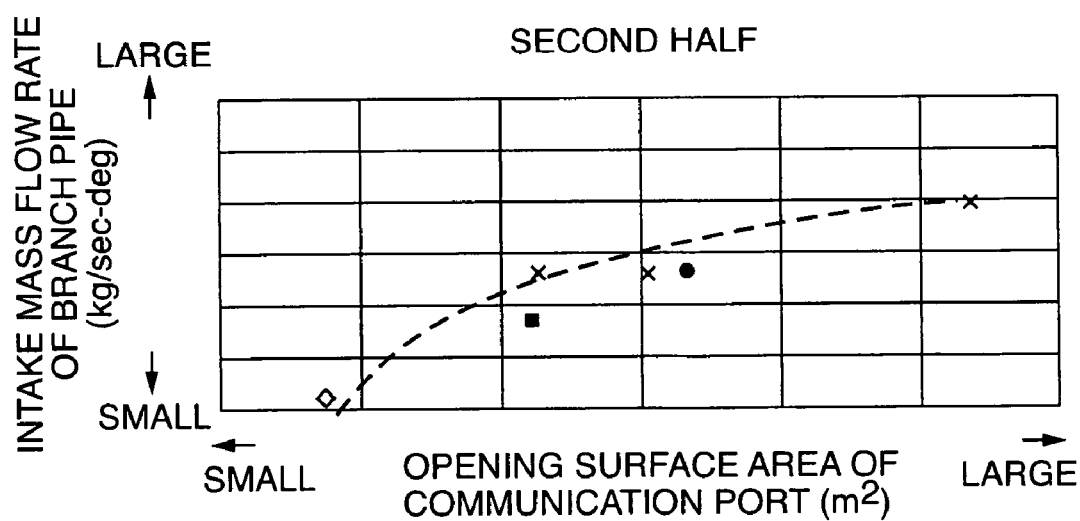

FIGS. 8A, 8B show the effect of the opening surface area of the communication port 25(26) on the mass flow rate of the branch pipes 23(24) during the intake stroke. FIGS. 8A relates to the first half of the intake stroke, and FIG. 8B relates to the second half of the intake stroke. As shown in the figure, the mass flow rate of the branch pipes 23(24) in the first half of the intake stroke decreases, whereas the mass flow rate of the branch pipes 23(24) in the second half of the intake stroke increases, as the opening surface area of the communication port 25 (26) increases.

Figure 9A:
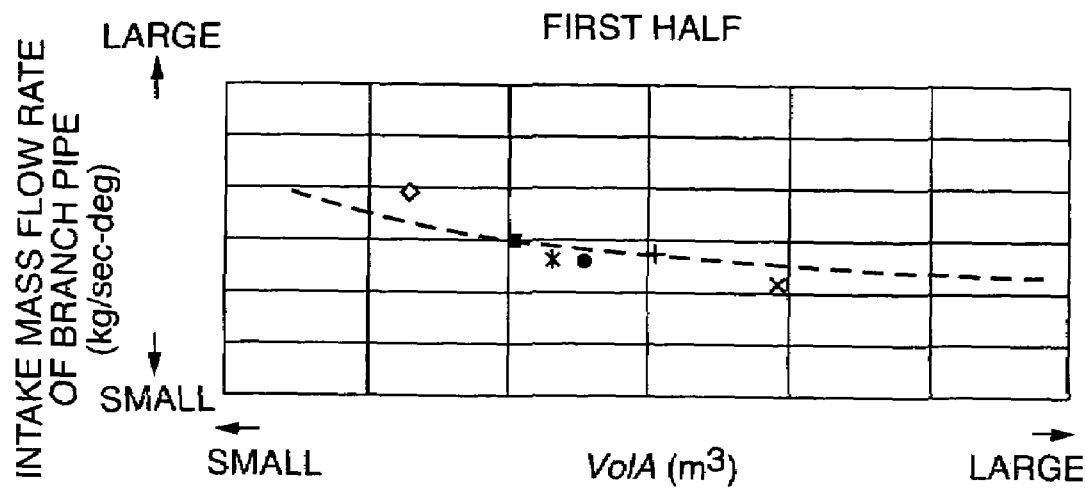
FIGS. 9A and 9B are diagrams describing a relation between the volume of an auxiliary chamber and the intake air mass flow rate of the branch pipe according to this invention.
Figure 9B:
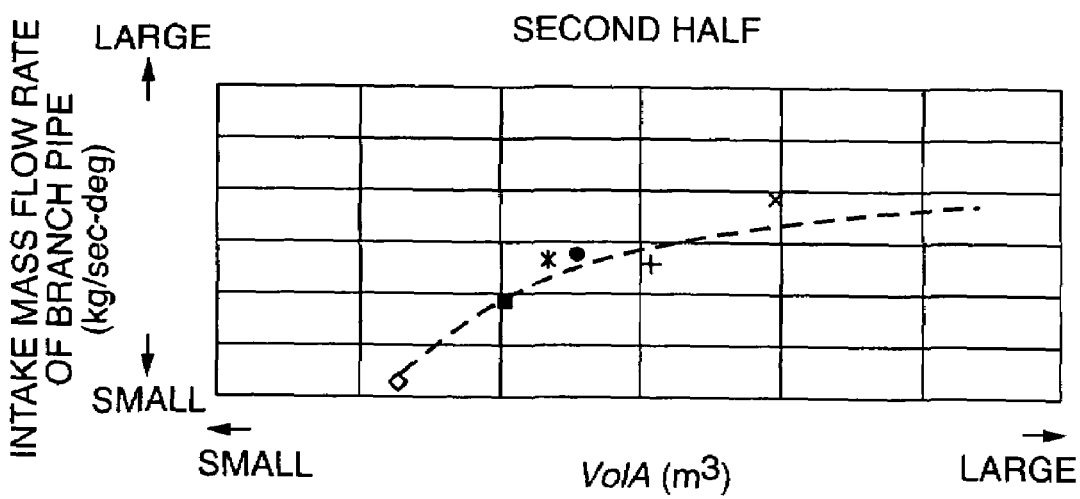

FIG. 9A shows the effect of the volume VolA of the auxiliary chamber 31 (32) on the mass flow rate of the branch pipes 23(24) in the first half of the intake stroke, and FIG. 9B shows the effect of a volume VolA of the auxiliary chamber 31(32) on the mass flow rate of the branch pipes 23 (24) in the second half of the intake stroke. The mass flow rate of the branch pipes 23(24) in the first half of the intake stroke decreases, whereas the mass flow rate of branch pipe 23(24) in the second half of the intake stroke increases, as the volume VolA of the auxiliary chamber 31(32) increases.

Figure 10A:
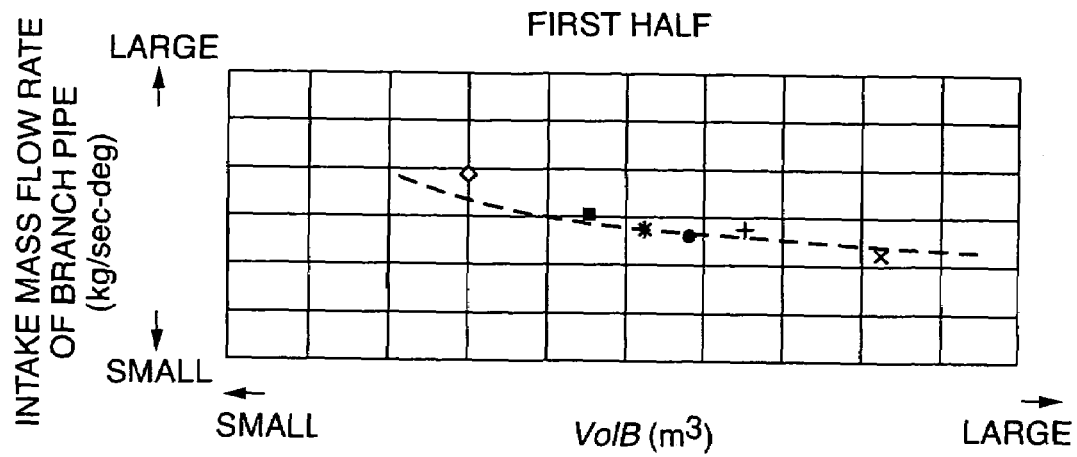
FIGS. 10A and 10B are diagrams describing a relation between the volume of the intake collector and the intake air mass flow rate of the branch pipe.
Figure 10B:
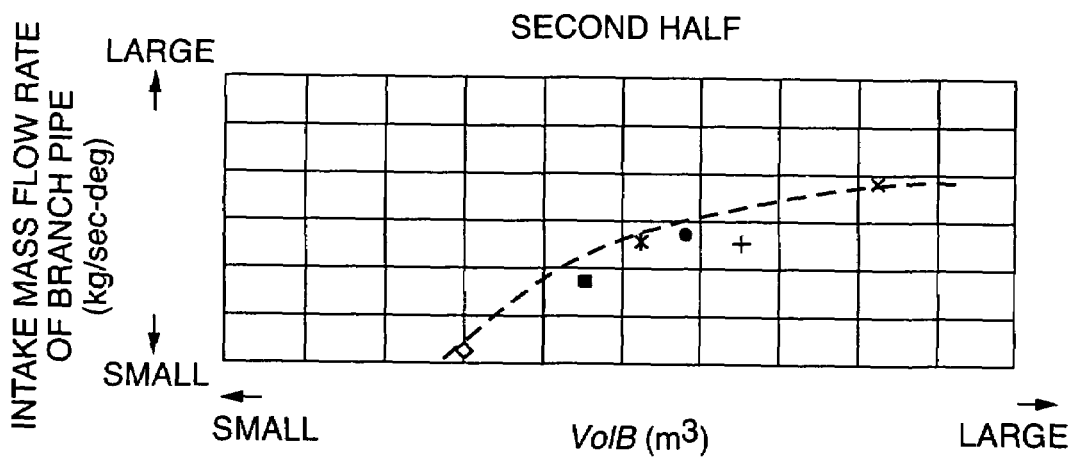

FIG. 10A shows the effect of the volume VolB of the intake collector 21 (22) on the mass flow rate of the branch pipes 23(24) in the first half of the intake stroke. FIG. 10B shows the effect of the volume VolB of the intake collector 21(22) on the mass flow rate of the branch pipes 23(24) in the second half of the intake stroke. The mass flow rate of the branch pipes 23(24) in the first half of the intake stroke decreases, whereas the mass flow rate of the branch pipes 23(24) in the second half of the intake stroke increases, as the volume VolB of the intake collector 21(22) increases.

Figure 11:
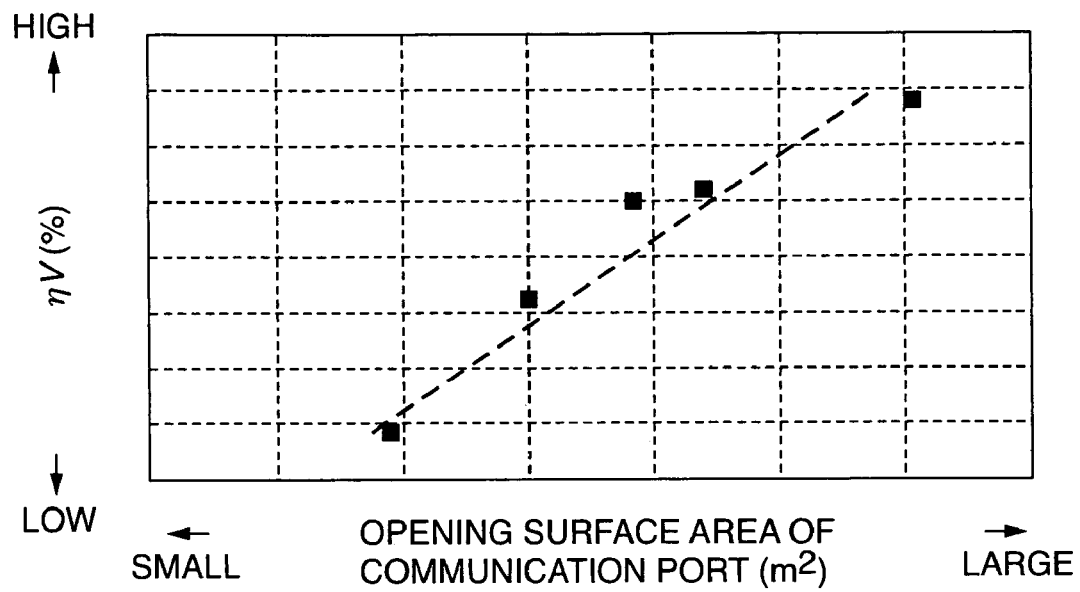
FIG. 11 is a diagram describing a relation between the opening surface area of a communication port and engine volumetric efficiency.
Figure 12:
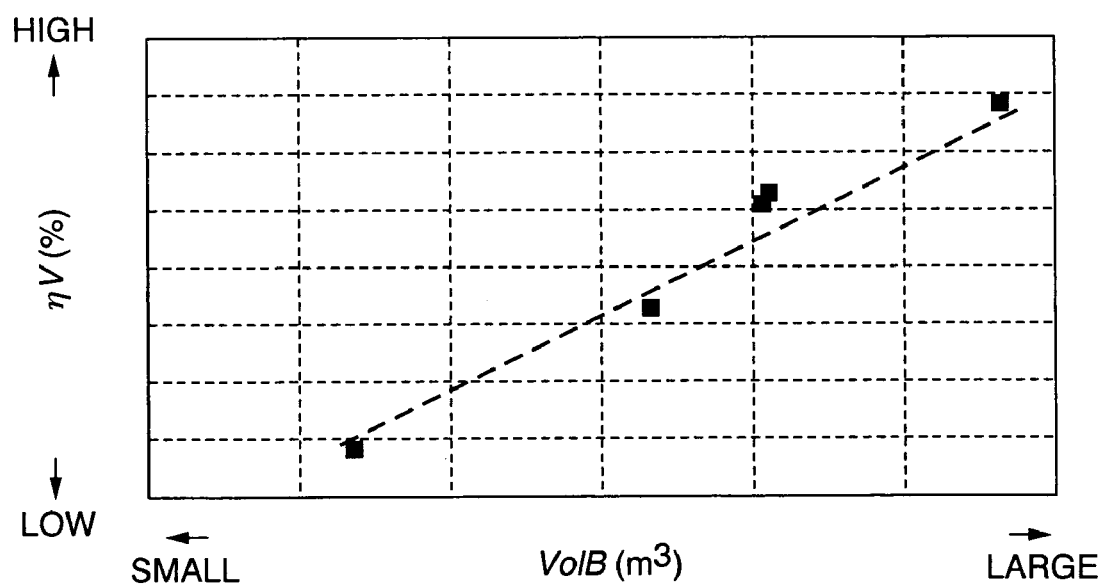
FIG. 12 is a diagram describing a relation between the volume of the intake collector and engine volumetric efficiency.

FIG. 11 and FIG. 12 show the effect of the intake device 20 according to this invention on a volumetric efficiency $\eta V(\%)$. FIG. 11 shows the relation between the surface area of the communication port 25(26) and the volumetric efficiency $\eta V(\%)$ of each cylinder, and FIG. 12 shows the relation between the volume VolB of the intake collector 21(22) and the volumetric efficiency $\eta V(\%)$.

As is clear from these figures, the volume efficiency of each cylinder increases the larger the surface area of the communication port 25(26) is, and the larger the volume VolB of the intake collector 21(22) is.

Here, as shown in FIGS. 8A, 8B, increasing the surface area of the communication port 25(26) causes an increase of volumetric efficiency equivalent to increasing the capacity of the intake collector 21(22) and auxiliary chamber 31(32) as shown in FIGS. 9A, 9B, FIGS. 10A, 10B and FIG. 11, FIG. 12. When an intake device is disposed between cylinder rows of a V type internal combustion engine, the volume of the intake collector 21(22) is limited in view of layout. By providing the auxiliary chambers 31(32) as in the intake device 20 according to this invention, the volume of the intake collector 21(22) is effectively increased, which increases the volumetric efficiency. By setting the surface area of the communication ports 25(26) to be as large as possible by forming the communication ports 25(26) between and above the branch pipes 26(26), the volumetric efficiency can be further increased.

The auxiliary chambers 31(32) have another effect. Specifically, the intake path leading from the throttle chambers 33(34) to the cylinders is split. As mentioned above, in the first half of the intake stroke, air is directly aspirated mainly from the intake collector 21(22) to the branch pipes 23(24). In the second half of the intake stroke, inflowing air from the auxiliary chamber 31(32) to the branch pipes 23(24) also assists the intake capability of the branch pipes 23(24). This phenomenon does not depend on the cylinder, so fluctuation of volumetric efficiency between cylinders is eliminated, and the torque generated by each cylinder is equalized.

Therefore, due to the intake device 20 disposed between the cylinder rows of the V type internal combustion engine, a desirable volumetric efficiency can be realized by using the limited space effectively.

The contents of Tokugan 2004-293412, with a filing date of Oct. 6, 2004 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in the above embodiment, two auxiliary chambers 31(32) are divided by the partition 37, but an opening may also be provided in the partition 37 so that the auxiliary chambers 31,32 and intake collectors 21,22 communicate with each other. In particular, as shown in FIGS. 2–4, in an engine wherein the throttle chamber 33(34) is connected via the connection port 35(36) provided at the end of the intake collector 21(22), a deviation in the intake path of the cylinder easily occurs depending on the cylinder. In such an engine, the provision of an opening in the partition 37 eliminates intake path deviations between cylinders, and has the effect of improving intake air distribution. Instead of providing an opening, the partition 37 can be omitted.

In the above embodiment, the throttle chamber 33 is connected to the intake collector 21 and the throttle chamber 34 is connected to the intake collector 22, but air may be led to the intake collectors 21, 22 via pipes branched off from a single throttle chamber.

As is clear from the above embodiment, this invention has a very desirable effect in a V type multi-cylinder internal combustion engine provided with two cylinder rows 11, 12. The invention itself can be applied not only to a V type engine, but to internal combustion engines of other types provided with plural cylinder rows.

In the above embodiment, although the communication ports 25, 26 are continuously formed over the whole length parallel to the crankshaft 15 inside the intake device 20, design modifications can be made freely regarding the position, number and shape of the communication ports 25, 26.

The embodiments of this invention in which an exclusive property or privilege is claimed are defined as follows.

What is claimed is:

1. An intake device for a multi-cylinder internal combustion engine having a crank shaft and two rows of cylinders aligned substantially in parallel with the crank shaft, the device comprising:
   two intake collectors respectively provided in the vicinity of the two rows of cylinders;

an air supply mechanism connected to the intake collectors to supply air thereto;

a group of branch pipes provided in each of the two rows of cylinders, wherein the branch pipes are disposed substantially in parallel with each other and connect the cylinders in the corresponding row with the corresponding intake collector, each of the branch pipes having an opening onto the corresponding intake collector;

an auxiliary chamber provided for each of the two rows of cylinders in a space between the two intake collectors, the space including a space between adjacent two branch pipes of the corresponding row; and a communicating port formed between the openings of the adjacent two branch pipes in each of the rows of cylinders and communicating the corresponding auxiliary chamber with the corresponding intake collector.

2. The intake device as defined in claim 1, wherein the two auxiliary chambers communicate with each other.

3. The intake device as defined in claim 1, wherein the air supply mechanism comprises a single throttle chamber which supplies air to the two intake collectors.

4. The intake device as defined in claim 1, wherein the air supply mechanism comprises two throttle chambers which supply air to the two intake collectors individually.

5. The intake device as defined in claim 1, wherein the auxiliary chamber comprises spaces partitioned by the branch pipes of the corresponding cylinder row in the direction of the crank shaft and a space formed above the branch pipes.

6. The intake device as defined in claim 5, wherein the communication port is formed between openings of adjacent branch pipes and above an opening of each branch pipe.

* * * * *